(12) United States Patent
Yoon

(10) Patent No.: US 12,462,304 B1
(45) Date of Patent: Nov. 4, 2025

(54) ULTRA LOW-LATENCY, HIGH-THROUGHPUT MATCHING ENGINE FOR ELECTRONIC TRADING SYSTEMS

(71) Applicant: Jin Seok Yoon, Elmwood Park, NJ (US)

(72) Inventor: Jin Seok Yoon, Elmwood Park, NJ (US)

( * ) Notice: Subject to any disclaimer, the term of this patent is extended or adjusted under 35 U.S.C. 154(b) by 0 days.

(21) Appl. No.: 19/080,927

(22) Filed: Mar. 16, 2025

(51) Int. Cl.
   *G06Q 40/04* (2012.01)

(52) U.S. Cl.
   CPC .................................. *G06Q 40/04* (2013.01)

(58) Field of Classification Search
   CPC ...................................................... G06Q 40/04
   See application file for complete search history.

(56) References Cited

U.S. PATENT DOCUMENTS

| | | | |
|---|---|---|---|
| 7,895,112 B2 | 2/2011 | Richmann et al. | |
| 7,933,827 B2 | 4/2011 | Richmann et al. | |
| 8,041,985 B2 | 10/2011 | Callaway et al. | |
| 8,082,206 B2 | 12/2011 | Troxel, Jr. et al. | |
| 8,117,609 B2 | 2/2012 | Lantz et al. | |
| 8,229,835 B2 * | 7/2012 | Milne | G06Q 40/00 705/37 |
| 8,244,622 B2 | 8/2012 | Hughes, Jr. et al. | |
| 8,489,792 B2 * | 7/2013 | Byrne | G06F 13/4027 709/230 |
| 8,868,461 B2 | 10/2014 | Rotella et al. | |
| 9,047,243 B2 * | 6/2015 | Taylor | G06F 15/167 |
| 11,243,826 B2 | 2/2022 | Adolfsson et al. | |
| 11,301,934 B2 | 4/2022 | Jensen et al. | |
| 11,410,231 B2 | 8/2022 | Liberman et al. | |
| 11,609,782 B2 | 3/2023 | Ahlqvist et al. | |

(Continued)

FOREIGN PATENT DOCUMENTS

| | | | | |
|---|---|---|---|---|
| WO | WO-2013090363 A2 * | 6/2013 | ....... | G06F 15/17331 |
| WO | WO-2016103055 A1 * | 6/2016 | ........... | G06F 16/322 |

OTHER PUBLICATIONS

Zoican, Marius: Dealing with micro-bursts: a congestion fee for high-speed markets, May 22, 2020, Medium, pp. 1-13. (Year: 2020).*

(Continued)

*Primary Examiner* — Bijendra K Shrestha

(57) ABSTRACT

A high-speed matching engine for electronic trading systems is disclosed. The system employs a flexible memory architecture featuring pre-constructed Data Holder Nodes and separate pools for Price Level Descriptors, allowing zero or more pointers per node while minimizing allocation overhead and enhancing cache locality. A single-threaded core match unit processes orders under price-time priority or another matching algorithm, handling trades, cancellations, and modifications in real time. Push-Forward and Push-Back operations dynamically maintain the order book. A cache-aligned data transport mechanism manages inbound orders and outbound acknowledgments, while an O(1)-access hash map and balanced tree enable efficient lookups. Through SIMD-optimized data movement, prefetching, huge pages, and carefully aligned memory structures, the system achieves throughput of up to 11.5 million orders per second per CPU core-equivalent to 30 million order messages per second per core.

25 Claims, 14 Drawing Sheets

(56) References Cited

U.S. PATENT DOCUMENTS 11,935,120 B2  3/2024  Friedman et al.
2010/0269102 A1* 10/2010 Latorre ............... G06F 9/3861
                                                        717/130

OTHER PUBLICATIONS

Mondal, Abhijit: Demystifying CPU Caches with Examples, Nov. 22, 2023, Medium, pp. 1-31 (Year: 2023).*

Biswas, Amitava: Designing Low Latency High Performance Order Matching Engine, Aug. 17, 2023, Medium, pp. 1-33 (Year: 2023).*

Yu et al.: HTLL: Latency-Aware Scalable Blocking Mutex, Mar. 2025, IEEE Transactions on Parallel and Distributed Systems, vol. 36, No. 3, pp. 471-486. (Year: 2025).*

Subramoni et al; Streaming, Low-Latency Communication in On-line Trading Systems; IEEE Intl Parallel & Distributed Processing Symp. Workshops (IPDPSW 2010); pp. 1-8.

Thompson et al; Disruptor: High Performance Alternative to Bounded Queues for Exchanging Data Between Concurrent Threads; LMAX Exchange Technical Whitepaper; Sec.3-4.

Barazzutti et al; Exploiting Concurrency in Domain-Specific Data Structures: a Concurrent Order Book and Workload Generator for Online Trading; Sec.3, Sec.4-5.

He, Conghui et al; Exploring the Potential of Reconfigurable Platforms for Order Book Update; Proc. 27th IEEE Intl. Conf. on Field-Programmable Logic and Applications; pp. 1-8.

Addison et al; Low-Latency Trading in a Cloud Environment; Proc. IEEE Intl. Conf. on Computational Science and Engineering/Embedded and Ubiquitous Computing; Sec.IV, Sec.V.

Bilokon et al; C++ Design Patterns for Low-Latency Applications Including High-Frequency Trading; Sec.3.3, Sec.4.2.

Kashera et al; Building Low-Latency Order Books with Hybrid Binary-Linear Search Data Structures on FPGAS; Proc. 33rd IEEE Intl. Conf.; pp. 299-304, Sec. III-IV.

* cited by examiner

Priority Flow →

| Sell Price: 95 Qty: 5 | Sell Price: 95 Qty: 7 | Sell Price: 95 Qty: 13 | Sell Price: 95 Qty: 88 | Sell Price: 99 Qty: 3 | Sell Price: 99 Qty: 5 |
|---|---|---|---|---|---|
| ↑ | | | ↑ | ↑ | ↑ |
| Price Level 95 Starting | Empty (0x0) | Empty (0x0) | Price Level 95 Ending | Price Level 99 Starting | Price Level 99 Ending |

The arrows here represent "corresponds to" relationship, not an actual pointing mechanism.

FIG 9

Orders To Be Executed ⟵— Incoming Buy Order at Price 95, Qty 10.

| Price: 95 Qty: 5 | Price: 95 Qty: 7 | Price: 95 Qty: 13 | Price: 95 Qty: 88 | Price: 99 Qty: 3 | Price: 99 Qty: 5 |
|---|---|---|---|---|---|
| | | Sell Orders Node | | | |
| Price Level 95 Starting | Empty (0x0) | Empty (0x0) | Price Level 95 Ending | Price Level 99 Starting | Price Level 99 Ending |

Previous State

| Price: 95 Qty: 2 | Price: 95 Qty: 13 | Price: 95 Qty: 88 | Price: 99 Qty: 3 | Price: 99 Qty: 5 | Empty |
|---|---|---|---|---|---|
| | | ⟵ Orders and Price Level Pointers have shifted to the left. ⟵ | | | |
| Price Level 95 Starting | Empty (0x0) | Price Level 95 Ending | Price Level 99 Starting | Price Level 99 Ending | Empty (0x0) |

Post-Processing State

FIG 10

*Appending a Sell Order at Price 95, Qty 10.

| Price: 95 Qty: 5 | Price: 95 Qty: 7 | Price: 95 Qty: 13 | Price: 95 Qty: 88 | Empty | Empty |
|---|---|---|---|---|---|
| Sell Orders Node ||||||
| Price Level 95 Starting | Empty (0x0) | Empty (0x0) | Price Level 95 Ending | Empty (0x0) | Empty (0x0) |

Previous State

| Price: 95 Qty: 5 | Price: 95 Qty: 7 | Price: 95 Qty: 13 | Price: 95 Qty: 88 | Price: 95 Qty: 10 | Empty |
|---|---|---|---|---|---|
| The newly inserted order has the lowest priority at price 95. Moved to the next slot. ||||||
| Price Level 95 Starting | Empty (0x0) | Empty (0x0) | Empty (0x0) | Price Level 95 Ending | Empty (0x0) |

Post-Processing State

Now, the lowest priority pointer at Price Level 95 corresponds to the newly inserted order.

FIG 11

*Prepending a Sell Order at Price 93, Qty 10.

| Price: 95 Qty: 5 | Price: 95 Qty: 7 | Price: 95 Qty: 13 | Price: 95 Qty: 88 | Empty | Empty |
|---|---|---|---|---|---|
| Sell Orders Node ||||||
| Price Level 95 Starting | Empty (0x0) | Empty (0x0) | Price Level 95 Ending | Empty (0x0) | Empty (0x0) |

Previous State

| Price: 93 Qty: 10 | Price: 95 Qty: 5 | Price: 95 Qty: 7 | Price: 95 Qty: 13 | Price: 95 Qty: 88 | Empty |
|---|---|---|---|---|---|
| Orders and Price Level Pointers have shifted to the right. ||||||
| Price 93 Starting / Ending | Price Level 95 Starting | Empty (0x0) | Empty (0x0) | Price Level 95 Ending | Empty (0x0) |

Post-Processing State

The newly inserted order has the highest priority in this node. (lowest ask)

FIG 12

*Appending a Sell Order at Price 95, Qty 10 to a Sell Orders Node.

| Price: 95 Qty: 5 | Price: 95 Qty: 7 | Price: 95 Qty: 13 | Price: 95 Qty: 88 | Price 98 Qty: 27 | Price: 98 Qty: 45 |
|---|---|---|---|---|---|
| The lowest priority order before appending gets "pushed back". (see 204 in FIG. 2) This order is treated as a "prepending" at the succeeding node. (see FIG. 12) | | | | | |
| Price Level 95 Starting | Empty (0x0) | Empty (0x0) | Price Level 95 Ending | Price Level 98 Starting | Price Level 98 Ending |

Previous State

| Price: 95 Qty: 5 | Price: 95 Qty: 7 | Price: 95 Qty: 13 | Price: 95 Qty: 88 | Price: 95 Qty: 10 | Price 98 Qty: 27 |
|---|---|---|---|---|---|
| Now, the lowest priority pointer at Price Level 95 corresponds to the newly inserted order. | | | | | |
| Price Level 95 Starting | Empty (0x0) | Empty (0x0) | Empty (0x0) | Price Level 95 Ending | Price Level 98 Starting |

Post-Processing State

FIG 13

*Prepending a Sell Order at Price 95, Qty 10 to a Sell Orders Node.

| Price: 93 Qty: 5 | Price: 95 Qty: 7 | Price: 95 Qty: 13 | Price: 95 Qty: 88 | Price 98 Qty: 27 | Price: 98 Qty: 45 |
|---|---|---|---|---|---|
| | | The highest priority order before prepending gets "pushed forward". (see 205 in FIG. 2) This order is treated as a "appending" at the preceding node. (see FIG. 11) | | | |
| Price 93 Starting / Ending | Price Level 95 Starting | Empty (0x0) | Price Level 95 Ending | Price Level 98 Starting | Price Level 98 Ending |

Previous State

| Price: 95 Qty: 10 | Price: 95 Qty: 7 | Price: 95 Qty: 13 | Price: 95 Qty: 88 | Price: 98 Qty: 27 | Price 98 Qty: 45 |
|---|---|---|---|---|---|
| | | Now, the highest priority pointer at Price Level 95 corresponds to the newly inserted order. | | | |
| Price Level 95 Starting | Empty (0x0) | Empty (0x0) | Price Level 95 Ending | Price Level 98 Starting | Price Level 98 Ending |

Post-Processing State

FIG 14

ULTRA LOW-LATENCY, HIGH-THROUGHPUT MATCHING ENGINE FOR ELECTRONIC TRADING SYSTEMS

REFERENCE TO RELATED APPLICATIONS

None.

CROSS-REFERENCES

None.

FIELD OF THE INVENTION

This invention relates to electronic trading systems and, more specifically, to a high-speed matching engine designed for processing large volumes of trade orders with ultra-low latency. The invention addresses the significant challenges of order congestion and unpredictable latency spikes caused by micro-bursts in modern financial markets.

BACKGROUND OF THE INVENTION AND PRIOR ART

Modern electronic trading platforms rely on matching engines to rapidly pair buy and sell orders and execute trades. These systems must maintain predictable low latency to ensure fair market operations and mitigate financial risks associated with execution delays. However, traditional matching engines are often overwhelmed by micro-bursts—short, intense spikes in order flow generated by advanced high-frequency trading algorithms. Such bursts temporarily exceed the processing capacity of conventional systems, leading to increased latency, wider bid-ask spreads, and reduced order book depth. Relevant studies, such as Aquilina et al. indicate that nearly 20% of transactions occur during these micro-bursts across the major exchanges, which adversely affects market makers, liquidity providers, and overall market quality. This problem has been exacerbated by the advent of sophisticated Artificial Intelligence based trading bots and ever-growing computational resources.

Existing solutions-including intentional speed bumps, periodic batch auctions, randomized order processing delays, and delayed market data dissemination—have been introduced to mitigate the effects of micro-bursts. However, these measures have failed to resolve the underlying throughput limitations of current matching engines. For instance, in 2017, NYSE American implemented a 350-microsecond "speed bump" designed to allow market makers sufficient time to update their quotes before high-frequency trading bots could exploit stale quotes. The measure, however, resulted in wider spreads (+40%), lower trading volume (−8%), and reduced market share, ultimately prompting its removal in 2019.

The core matching process is designed to operate in a single-threaded mode for each symbol, ensuring strict enforcement of order time priority. While it is technically feasible to run multiple order books concurrently for the same symbol, merging different symbols into one order book is not advisable because each symbol represents a distinct asset. According to Amdahl's law, the portion of work that cannot be parallelized becomes the bottleneck, regardless of how many computational resources are available. Consequently, the overall throughput of the matching engine is ultimately limited by the latency of the core match process, since the core match throughput is essentially the inverse of its processing latency.

SUMMARY OF THE PROBLEM

The core issue with prior art matching engine technologies is its inability to efficiently scale throughput during periods of extreme order flow. One of the world's largest exchanges, such as Deutsche Börse group's Eurex, typically achieve a throughput of about 200,000 orders per second per CPU core based on their July 2024 technical publication. During micro-bursts, however, the surge in order volume far exceeds this capacity, leading to severe latency spikes. This limitation forces market makers to adopt more defensive quoting strategies, since they are unable to quickly change the quote due to the overwhelmed matching engine and thus their orders being sniped by "faster" opportunistic high-frequency trading bots, which increases bid-ask spread and ultimately reduces revenue for exchanges.

SUMMARY OF THE INVENTION

The present invention overcomes these limitations by introducing a matching engine design that significantly increases processing throughput while maintaining low, deterministic latency. In one embodiment, written in C++, handles up to 11.5 million orders per second per core on a readily available off-the-shelf laptop with 4.0 GHz CPU clock frequency, which corresponds to up to 30 million order messages per second per core. Key features include the following:

An optimized cache-warming technique leverages the hardware's cache line size to strategically determine which data should be loaded into CPU registers and L1-L3 caches, and which data should bypass the cache for direct streaming into memory. This selective approach substantially reduces latency and boosts throughput by ensuring that critical information is readily accessible, while non-essential data is handled efficiently in main memory.

An optimized memory pool that assigns empty slots according to the hardware's page size and the object's size, ensuring efficient alignment and minimal fragmentation. In addition, the memory pool allocates objects based on the maximum likelihood of a particular memory address remains in the cache, thereby drastically reducing cache misses and substantially improving overall performance.

A Price Level Descriptor data structure defines the boundaries of each price level, specifying the highest- and lowest-priority orders. It employs a tree-based organization to efficiently manage price levels while maintaining order priority. By directly referencing the relevant Data Holder Node, the structure enables constant-time (O(1)) insertion of incoming orders via append or prepend operations, ensuring minimal latency and optimal order book maintenance.

A specialized data structure, referred to as the "Data Holder Node," is designed for efficient order storage and price-level management. Structurally similar to an unrolled linked list, it enables cache-friendly, contiguous storage of orders while maintaining direct pointers to corresponding price levels. The Data Holder Node dynamically adjusts its contents by shifting orders forward or backward based on runtime conditions, optimizing node utilization and minimizing fragmentation. This adaptive design reduces overhead, lowers cache misses, and improves throughput, ensuring high-speed order processing under varying market conditions.

BRIEF DESCRIPTION OF DRAWINGS

The present invention is described in detail through non-limiting examples with reference to the accompanying drawings.

FIG. 9 is an illustration depicting the relationship between orders and Price Level Pointers within a Data Holder Node.

FIG. 10 is an illustration of a procedural overview of order execution within a Data Holder Node.

FIG. 11 is an illustration of the Append operation within a Data Holder Node.

FIG. 12 is an illustration of the Prepend operation within a Data Holder Node.

FIG. 13 is an illustration of the Push Back operation within a Data Holder Node.

FIG. 14 is an illustration of the Push Forward operation within a Data Holder Node.

BEST MODE FOR CARRYING OUT THE INVENTION

The present best mode for implementing this invention involves using a low-level language such as C or C++, which allows direct memory control. When used with a garbage-collected language, the user must disable the garbage collector to prevent any interferences from the garbage collector. For optimal data movement, the hardware should support at least 128-bit SIMD instructions, with 256-bit or 512-bit instructions being ideal. A major source of processing latency arises from storing each incoming order's unique identifier in a hash map, so the choice of hash map should match the hardware architecture. A linear, closed-hashing approach is generally recommended.

DETAILED DESCRIPTION

The disclosed embodiments relate to a method for constructing a high-speed matching engine by integrating the unique techniques described herein, resulting in one of the fastest known matching engine architectures to date.

Figure 1:
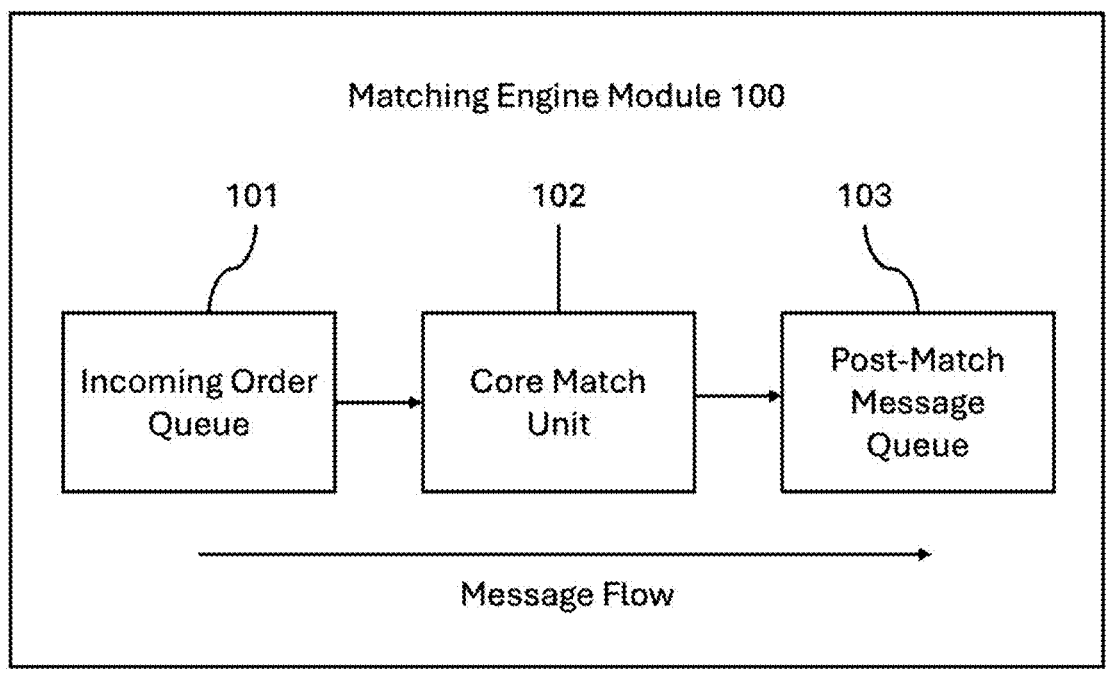
FIG. 1 is a schematic diagram illustrating a general overview of the core matching process.

By matching engine, we mean the matching engine module 100 in FIG. 1, which is consisted of the incoming order queue 101, the core match unit 102, and the post processing message queue 103.

Although these three modules can be combined in various ways, one exemplary embodiment employs a Single-Producer, Single-Consumer (SPSC) queue for both the incoming order queue 101 and the post-processing message queue 103, leveraging the fact that the core match unit 102 is inherently single-threaded for each distinct ticker symbol. Alternatively, if an exchange's gateway requirements dictate, the incoming order queue 101 may be configured as a Multi-Producer, Single-Consumer (MPSC) queue, and the post-processing message queue could be either MPSC or Multi-Producer, Multi-Consumer (MPMC), depending on specific system needs. Regardless of the chosen queue type, distributing each incoming order to its corresponding core match unit 102 is most efficiently implemented with hardware-level optimizations to maximize performance.

Figure 3:
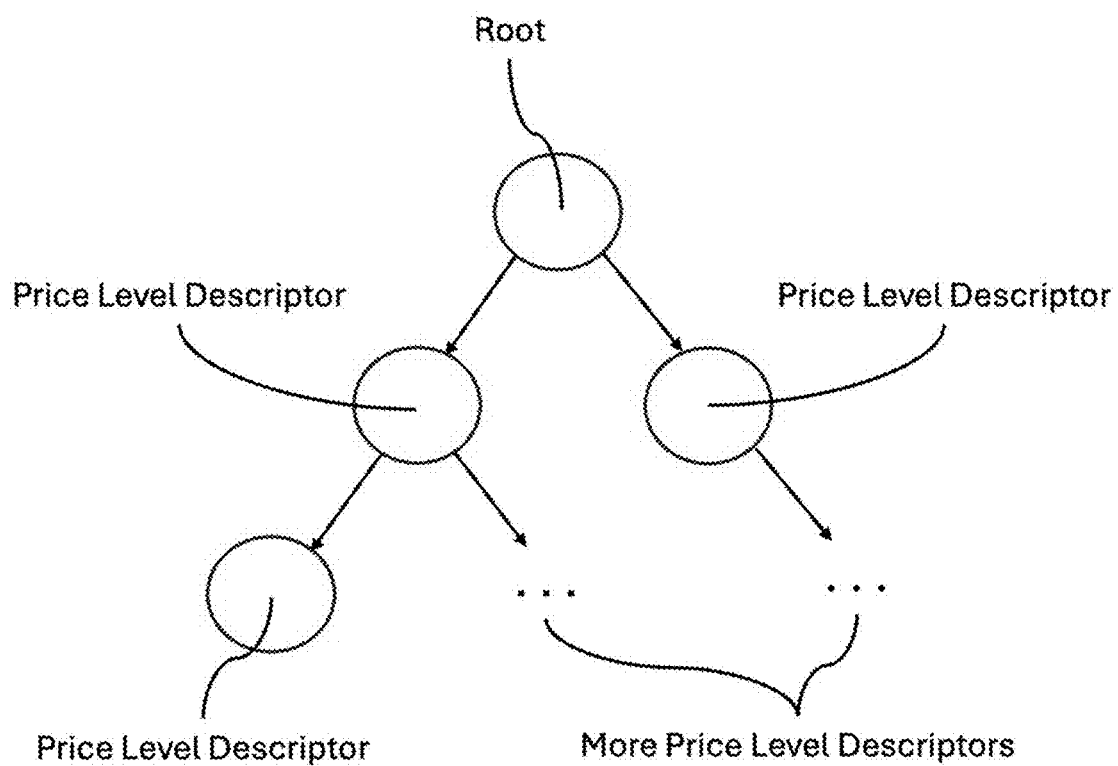
FIG. 3 is an illustration showing the alignment of Price Level Descriptors in a tree-like structure.
Figure 4:
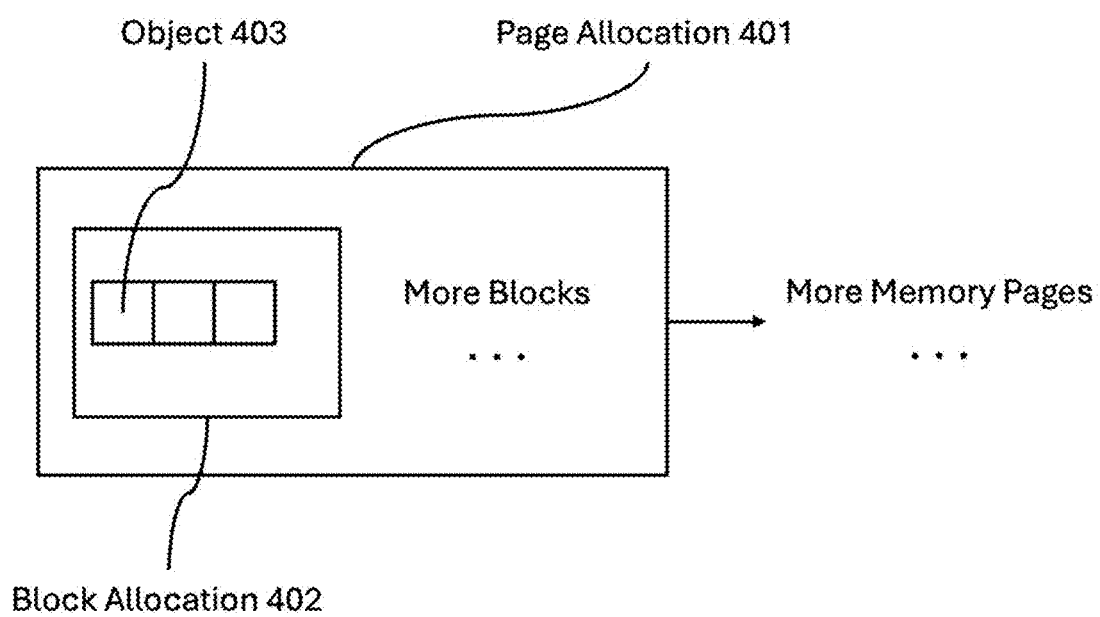
FIG. 4 is a high-level overview of the specially designed memory pool.
Figure 8:
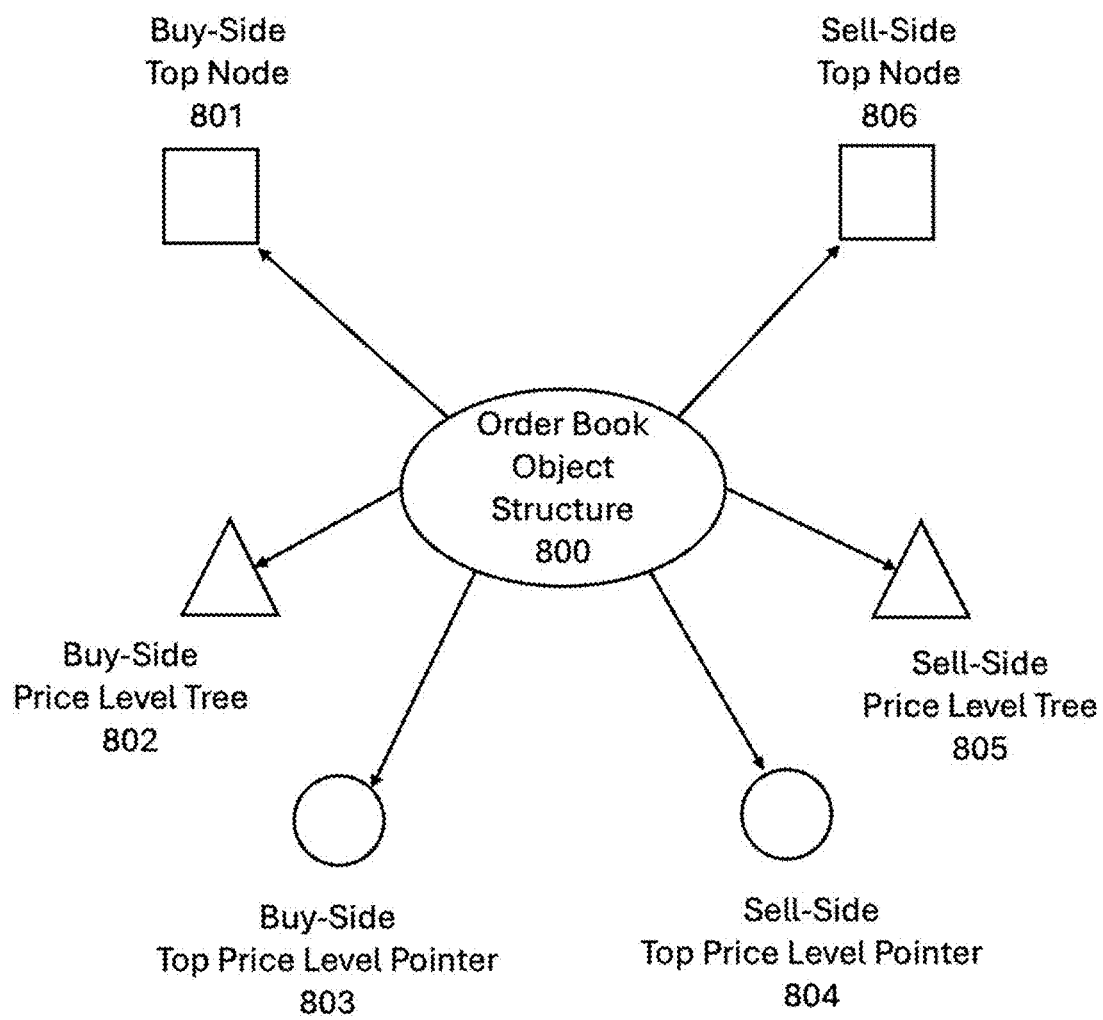
FIG. 8 is a schematic diagram showing the object structure of the order book.

Before describing the matching process in detail, it is necessary to explain the underlying data structure of the order book 800 (see FIG. 8), including the Data Holder Node 200 (see FIG. 2), the Price Level Descriptor (see FIG. 3), and the memory pool (see FIG. 4).

Figure 2:
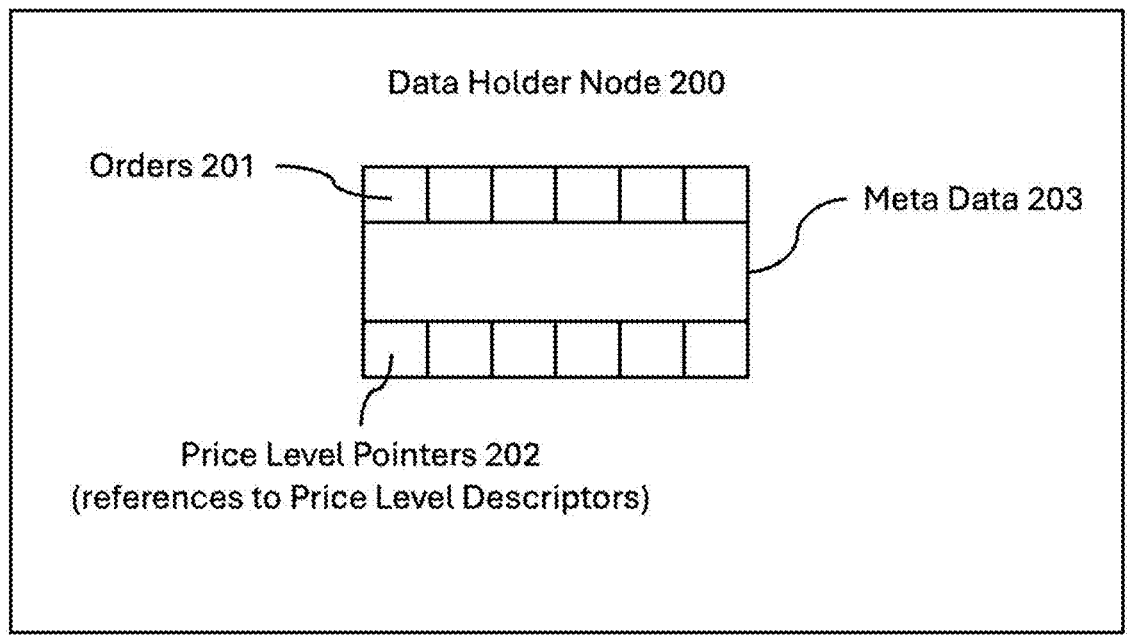
FIG. 2 is a high-level diagram illustrating Data Holder Nodes, which store orders and Price Level Pointers, along with the relevant operations performed on them.
Figure 2:
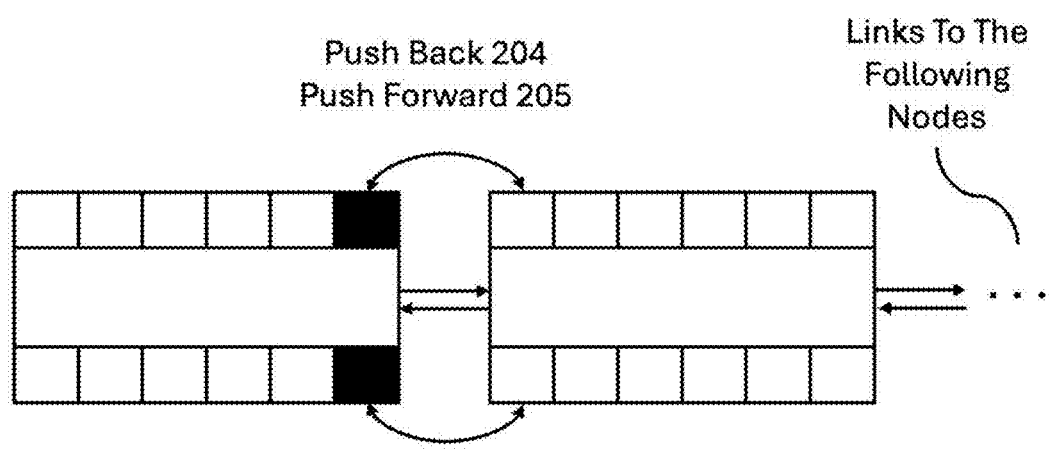

Referring to FIG. 2, the Data Holder Node 200 comprises three principal regions: a contiguous block of memory for storing orders 201, an area containing Price Level Pointers 202 that reference associated Price Level Descriptors, and a metadata section 203. The metadata typically includes fast-lookup information, such as the current count of orders within the node. In this exemplary embodiment, nodes are doubly linked for ease of traversal; however, a singly linked arrangement could be employed if desired, at the cost of greater implementation complexity. A defining advantage of the Data Holder Node 200 over conventional, linked-list-based approaches is its use of a fixed-capacity block of memory that can hold orders with differing prices in contiguous storage. Traditional designs typically store an unbounded list of orders at a single price level, necessitating pointer dereferences for each insertion, deletion, or lookup. By contrast, the contiguous memory layout in the Data Holder Node 200 provides direct indexing of orders without per-order pointer dereferences, thereby significantly reducing latency and improving cache efficiency.

Continuing with the Data Holder Node, orders 201 are stored as objects directly within the node's contiguous section rather than as pointers. By contrast, the Price Level Pointers 202 are stored solely as references to externally allocated Price Level Descriptor objects, typically implemented as pointers to those objects. The node itself does not embed the actual Price Level Descriptor objects, which are allocated and maintained separately—often in a dedicated memory pool. This design choice reduces memory overhead within the Data Holder Node and preserves stable references to the Price Level Descriptors, a critical requirement for building the tree structure described later. In this embodiment, each price level uses two pointers—one for the highest-priority order (start) and one for the lowest-priority order (end), as shown in FIG. 9. An alternative configuration includes only an end pointer, reducing complexity but limiting certain functionalities (e.g., jumping to the front of the queue).

Because a single order can represent both the highest and lowest priority if it is the only order at its price level, each order may occupy two pointer slots in the Price Level Pointer holder 202. Thus, when both highest- and lowest-priority pointers are employed, the number of pointer slots can be twice the number of order slots 201. Conversely, if only the lowest-priority pointer is used, the pointer slots match the number of order slots.

When multiple orders occupy the same price level, the Price Level Pointer container remains empty between the highest-priority and lowest-priority orders (see FIG. 9). In this embodiment, each Price Level Pointer in the Data Holder Node corresponds to a specific slot in the node's internal pointer container. Consequently, whenever the node's internal order structure changes—such as during execution, insertion, or cancellation—the orders are realigned according to their priority, and the Price Level Pointers move with their respective slots. This mechanism ensures that each pointer continuously references the correct order for its designated priority position (see FIG. 10). For example, if the highest-priority order is canceled or executed, its pointer shifts to the slot that corresponds to the next highest-priority order, while the lowest-priority pointer moves to reflect any newly appended order at the lower end.

To efficiently move orders within the Data Holder Node or across different nodes, this embodiment employs a specialized function—referred to as SIMD_COPY—that leverages hardware-specific vector instructions for transferring data in large blocks. On x86_64 systems, for instance, the function typically uses AVX2 instructions to read and write 256-bit registers, enabling the movement of up to 32-64 bytes at a time. While these instructions (e.g., _mm256_loadu_si256) can handle unaligned memory access, there may be a performance penalty if data is not properly aligned. In contrast, ARM NEON-based architectures often handle unaligned memory more seamlessly, mitigating much of the alignment overhead. For any platform that does not support these vector instructions, the function reverts to a fallback approach (such as a standard memory copy). By ensuring each data element is trivially copyable and sized in multiples of 32 bytes, this SIMD_COPY mechanism can significantly reduce latency, maintaining the high-speed requirements crucial for modern matching engines.

In addition to moving bulk data, the system also shifts pointer values—often 8 bytes each—between nodes or within the same node. Because these pointer updates are comparatively small (normally, one 64-bit words), they remain very fast even if SIMD instructions are not used. In particular, aligning these pointer slots to at least 8-byte boundaries ensures minimal overhead during pointer swaps or adjustments. This is critical when reassigning Price Level Pointers, updating doubly linked lists, or performing other pointer-based operations (e.g., re-linking nodes after an order is canceled or executed). By carefully managing both large data moves with SIMD and pointer realignments, the system maintains high throughput while minimizing latency throughout the matching process.

As part of the cache-warming strategy, the system provides a storage-realignment function that shifts orders inside a Data Holder Node to create contiguous free space for new inserts. The function first validates the target insert position in the order slot and the current order count, then selects an optimal movement strategy based on the number of slots to shift and the hardware's cache-line size. By prefetching entire cache lines of the order slots and the Price Level Pointer slots, and performing the shift in SIMD-sized blocks, the routine minimizes cache misses and guarantees that subsequent Append and Prepend operations execute without additional realignment overhead.

Depending on the ratio of cache line size to order size, the function selects different code paths using compile-time conditions (e.g., C++'s constexpr if). It aligns prefetching to cache line boundaries and shifts orders in blocks via SIMD-based operations. Prefetching is executed in write mode and directed to the L1 cache to ensure immediate data availability and maximize performance.

After shifting the order data, the function updates an associated pointer array using a safe memory move operation (e.g. std::memmove in C++) to preserve the relationship between orders and their metadata. An assertion then confirms that each pointer correctly corresponds to its order's price, ensuring data integrity. Overall, this function exemplifies a sophisticated cache-warming technique that combines hardware-aware prefetching, SIMD-optimized data movement, and precise pointer management to achieve high performance in a data-intensive trading environment.

The Data Holder Node supports two primary operations: Append and Prepend. Append adds an incoming order at the ending Price Level Pointer (see FIG. 11), effectively placing the new order at the end of the existing priority chain for that price level. In doing so, the ending pointer shifts its corresponding relationship to the newly appended order. In this embodiment, appending at the starting pointer location is disallowed to avoid potential errors, though an exchange may opt to enable it if needed. By contrast, Prepend places an incoming order in front of the starting Price Level Pointer, shifting that pointer to the newly prepended order and modifying the overall priority chain (see FIG. 12). This approach is particularly relevant when the order's priority exceeds that of the current top-level order—such as a newly arrived lowest ask at Sell Orders Node, or if a "jump to the front" mechanism is required to override priority.

In addition to Append and Prepend, the Data Holder Node offers two derivative mechanisms—Push Back (204) and Push Forward (205)—to maintain an orderly state across multiple nodes (see FIG. 2, FIG. 13, and FIG. 14). For example, if the system tries to append an order to a node that is already full, an existing order—along with its Price Level Pointer (or a null pointer if none is assigned)—may be pushed back to the next node (see FIG. 13). The system decides which order to move by comparing the priority of the node's last order with that of the incoming order. Once pushed back, the displaced order is treated as a newly prepended order in the succeeding node, and the system processes it accordingly.

If the succeeding node is also at capacity, the Push Back operation may cascade further, as the least-priority order and its corresponding Price Level Pointer in that node will in turn be pushed back to the next node. In the event that a Push Back occurs and no succeeding node exists, a new Data Holder Node is created to accommodate the pushed-back order and its corresponding Price Level Pointer. In practice, we recommend limiting this cascading to fewer than five iterations, though the exact threshold should be determined experimentally based on hardware characteristics (e.g., cache line size, memory bandwidth). A higher cascade limit is more likely to keep the nodes filled with orders, potentially improving cache performance, but it also increases processing overhead for each push back. Consequently, both the maximum node capacity (in terms of orders or Price Level Pointers) and the cascade limit must be tuned to the system's architecture to achieve the optimal balance between throughput and latency.

In contrast, Push Forward handles a result of prepending at a full node (see FIG. 14). Similar to Push Back, Push Forward moves an order and its associated Price Level Pointer to the preceding node, determined by the priority status of the orders involved. If the preceding node is also full, the operation may cascade further, causing the highest-priority order and its associated Price Level Pointer to be pushed forward to the previous node. If no preceding node exists, a new Data Holder Node is created to accommodate the order and its associated Price Level Pointer. As with Push Back, it is advisable to limit the maximum number of Push Forward cascades to maintain predictable performance under varying hardware conditions.

The Price Level Descriptor includes a metadata section containing the price level itself, the total quantity at that level, and a pointer to the Data Holder Node holding either the highest-priority or lowest-priority order (depending on the pointer's role). Additionally, the Price Level Descriptor is organized as a tree structure (see FIG. 3) to achieve O(log n) lookups when searching for the nearest available price. While this embodiment uses a red-black tree implementation, any balanced tree (e.g., AVL tree) is viable, provided it supports O(log n) searching for the closest price. It should be noted that AVL trees often require more frequent rebalancing, which can introduce additional overhead compared to red-black trees. Therefore, the choice of tree structure depends on the exchange's performance requirements and tolerance for rebalancing costs. The trees are constructed on each side of the order book (Buy and Sell) and their roots 802 and 805 are encapsulated in the Order Book object structure 800. (see FIG. 8) As part of its cache warming strategy, this embodiment preloads the tree's traversal path into the L3 cache, enabling efficient read access for subsequent lookups.

As illustrated in FIG. 4, the invention introduces a memory pool that allocates memory in large, contiguous pages—typically 2 MB, but configurable to 1 GB on systems that support larger huge pages. These pages are allocated according to the system's huge page configuration, ensuring optimal memory management and performance. Within each allocated page, the memory is subdivided into fixed-size blocks (402) that store multiple objects of a predetermined type.

Each block is designed to hold a specific number of objects, and its structure is optimized to minimize memory fragmentation and maximize cache locality. The custom block allocator is responsible for mapping and unmapping these large pages. When a block becomes fully occupied, it is removed from the free list; conversely, if a block becomes entirely empty, its parent page is unmapped and returned to the operating system.

One of the key differentiators of this memory pool is that the objects are preconstructed within each block at the time of block allocation. Rather than constructing a new object on each assignment request, the pool simply returns a pointer to an already constructed object within the preallocated block. This eliminates the runtime overhead of object construction, thereby speeding up the allocation process significantly-a crucial advantage in environments where every nanosecond counts.

Within each block of this embodiment, free slots are tracked using an array that is directly allocated as part of the block's memory rather than be allocated in another heap memory space (e.g. std::vector in C++). This design choice avoids the need for additional pointer dereferences, which can add latency. When an object is released, its slot index is returned to this array, ensuring that free slots are efficiently managed and immediately available for reuse. This method of in-block free slot management helps maintain a high level of cache efficiency, as all relevant data remains in a contiguous memory region.

By basing page allocations on the system's huge page configuration—either 2 MB or 1 GB—the memory pool is highly adaptable to various hardware environments. Large page allocations reduce the frequency of TLB misses and improve memory bandwidth, which is essential for the performance of data-intensive applications like matching engines. The combination of preconstructed objects, efficient block-level management, and in-block free slot tracking creates a scalable, low-latency memory management system that sets this invention apart from conventional memory allocators.

In this embodiment, each memory pool object is core-specific, rather than shared among multiple processor cores. This design choice avoids the overhead of implementing thread-safe concurrency within the memory pool itself, thereby reducing latency for high-throughput operations. However, it may result in higher overall memory usage if certain cores process fewer orders than others—some pools may remain underutilized while others are at capacity. To address this imbalance, the exchange can assign different page sizes (e.g., 2 MB, 1 GB, or even 4 KB if the processing requirement is not intensive) to each core based on anticipated order volume for its assigned symbols, optimizing memory consumption across the entire system.

Figure 6:
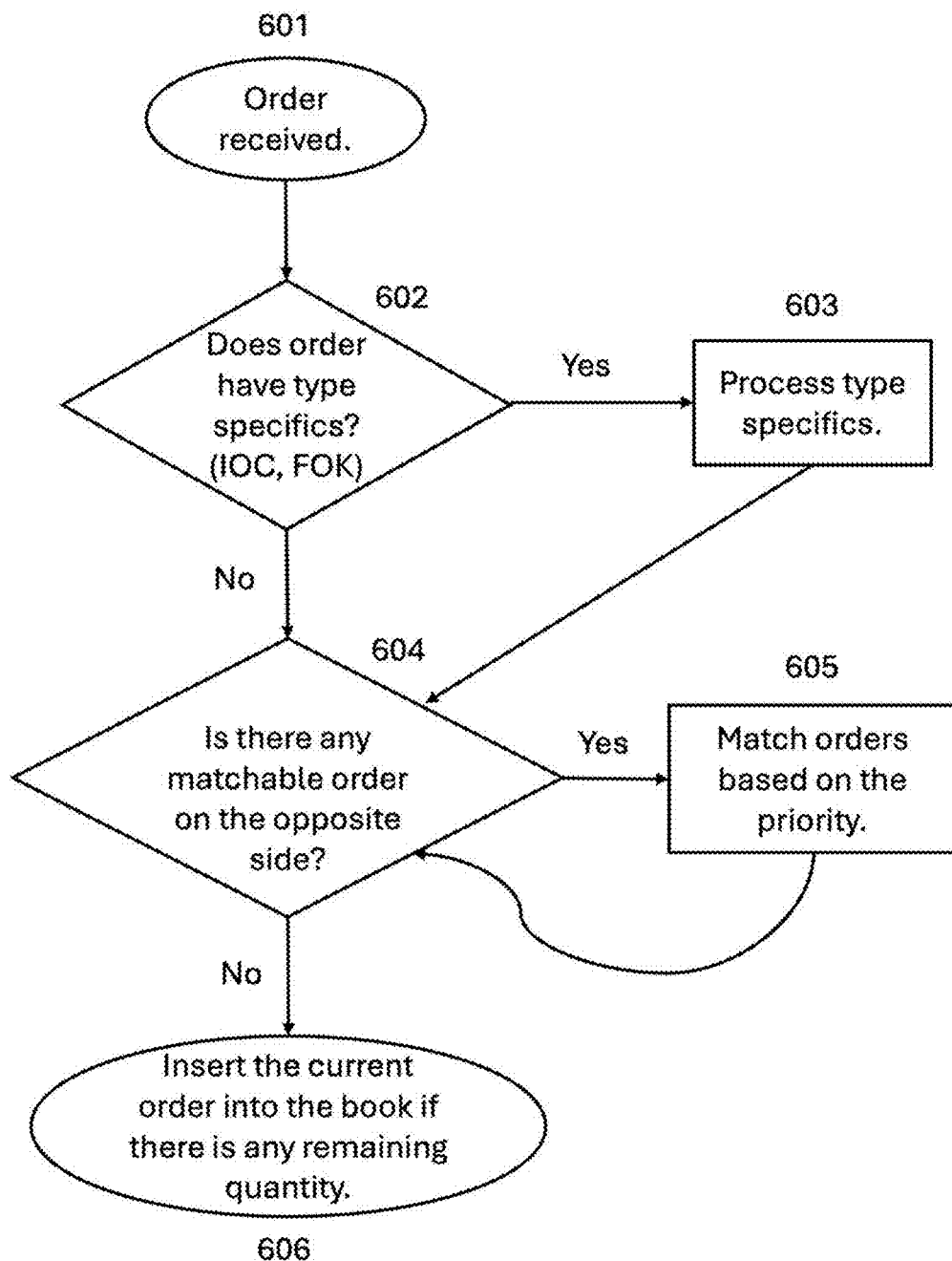
FIG. 6 is a flowchart outlining the matching process between an incoming order and existing orders in the order book.

The following section describes the algorithms employed by the core match unit 102. Referring to FIG. 6, the processing logic flow for the core matching process is illustrated. When an order arrives (601), the system immediately sends an order acknowledgment to the post-processing message queue 103. Next, it processes any special order designations associated with the incoming order (602). Examples of such designations (603) include Immediate-Or-Cancel (IOC) and Fill-Or-Kill (FOK), as defined by the exchange's rulebook and supported order types. The system then checks for any matchable order on the opposite side (604). In this embodiment, the presence of a matchable order is confirmed by determining whether the top priority price level pointer on the opposite side is active. Because the order book structure 800 maintains the references to the highest-priority (lowest ask and highest bid) Price Level Descriptors for both sides (803 and 804), the relevant pointer address is often stored in the processor's register, making the lookup operation extremely fast. Although the system could also inspect the top nodes (801, 806), it is preferable to avoid reading the underlying memory content to reduce latency. Instead, checking only whether the pointer address is null suffices to confirm availability.

Once a matchable order is identified, the system enters an iterative process to execute orders based on their priority (605). Depending on the exchange's requirements, the matching algorithm may employ a FIFO (first-in, first-out) approach, a pro-rata method, or a hybrid of these techniques to ensure orders are executed according to the prescribed priority rules. For each match, a trade signal is emitted to the post-processing message queue 103. If a price level is exhausted (i.e., no remaining orders at that level), the corresponding Price Level Descriptor is released to the memory pool. Similarly, if all orders in a Data Holder Node are depleted, that node is also returned to the pool. This prompt release of unused resources ensures high performance and efficient memory utilization throughout the matching process. Once no further orders can be matched, the system proceeds to the order insertion process (701) if any remaining quantity exists on the incoming order; otherwise, it exits the process.

Figure 7:
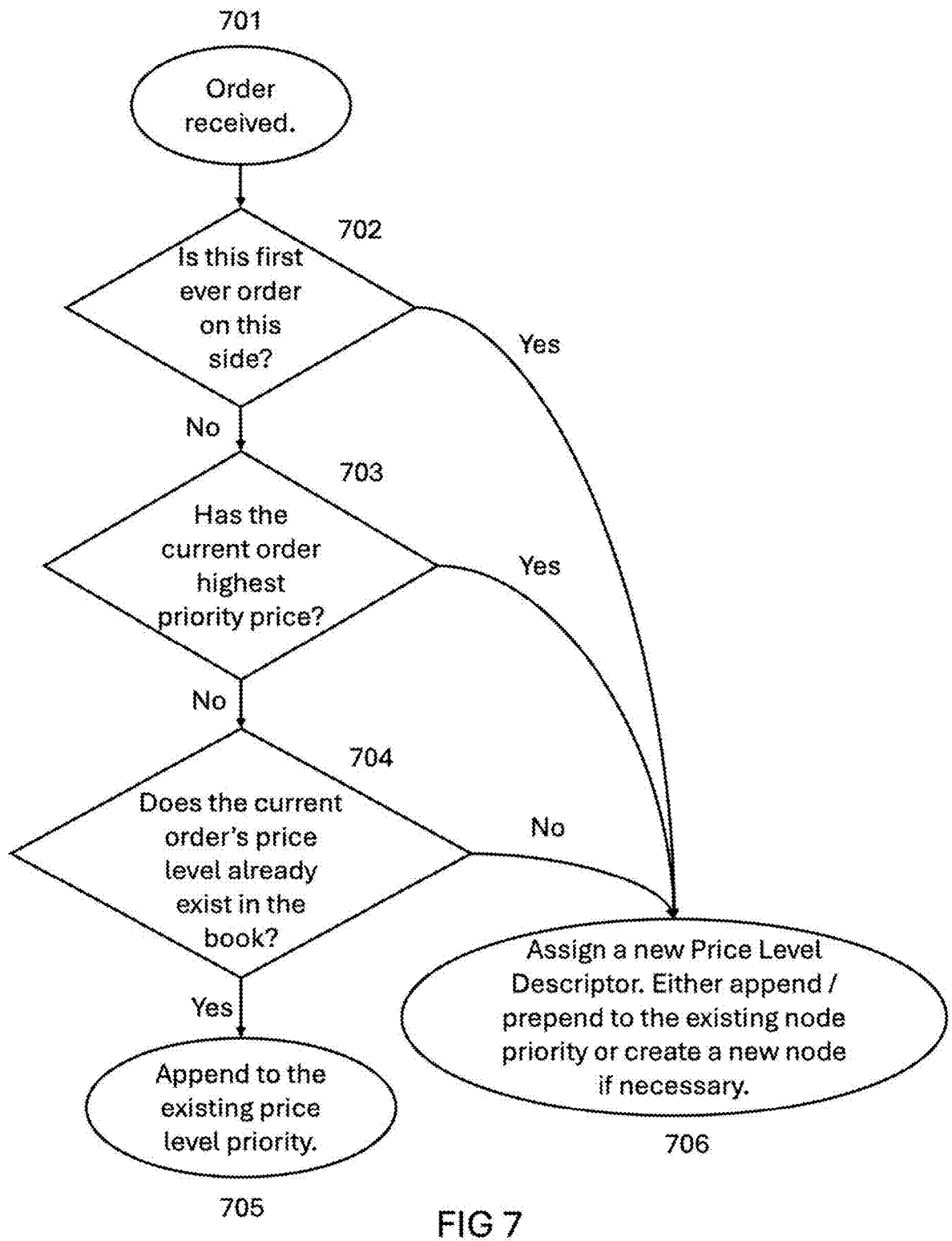
FIG. 7 is a flowchart illustrating the process of inserting an incoming order into the order book.

FIG. 7 illustrates the order insertion process. At step (701), the system first verifies whether the incoming order's price is already present in the order book (step 704). If the price exists, the system proceeds with an appending procedure (step 705) by accessing the Data Holder Node that holds the lowest-priority order for that price level. If the price is not present, the system creates a new Price Level Descriptor for the incoming order and inserts it into the order book. Although FIG. 7 depicts steps (702) and (703) sequentially, these steps merely represent special cases arising when the price level is absent. In alternative embodiments, the processing order of steps (702), (703), and (704) may be rearranged as appropriate to effectively address these special cases during order insertion. In this embodiment, the presence of a price level is confirmed by checking whether its corresponding Price Level Descriptor exists in the structure. In another embodiment, however, an O(1)-access hash map could be used for this check—particularly if that embodiment processes Case 704 before Cases 702 or 703.

Case 702 (First Ever Order):

This situation arises when the book is empty on the given side (e.g., Buy or Sell). It always involves creating a new Data Holder Node since there are no existing nodes for that side. Because this scenario is relatively rare, the implementation can optimize branch prediction accordingly.

Case 703 (New Highest Priority):

If the incoming order's price resets the highest-priority level (lowest ask or highest bid), the system performs a prepending procedure rather than an append. It locates the current highest Price Level Pointer and accesses the corresponding Data Holder Node to place the new order at the front. In some instances, no new Data Holder Node is created here—only the prepending operation on the existing node for the current highest priority.

For orders whose price does not exist in the book but is not the highest priority, the system locates the correct position by performing a Ceiling operation (for Buy orders) or a Floor operation (for Sell orders) on the existing price levels. Once the next higher-priority price level is identified, the system appends the order to the end of that level's order list. Additionally, any operation that creates a new Price Level Descriptor must record its reference in the relevant Data Holder Node and register it in the Price Level Descriptor tree (see FIG. 8, elements 802 or 805). This ensures that the system can efficiently perform future ceiling or floor lookups, facilitating the management of newly inserted price levels.

In every order insertion process, the system registers the Data Holder Node address for the incoming order in a hash map, ensuring O(1) lookups. This mapping is crucial for subsequent operations—such as order cancellation and order modification—because it enables the system to quickly locate and update the relevant order. Similarly, this logic applies to Push Back (204) and Push Forward (205) operations, because once an order is moved to a different Data Holder Node, the hash map must be updated to reflect the new node address for accurate future lookups. For hash map selection, we suggest using a custom closed-hashing design with SIMD-optimized lookups that generally delivers superior performance.

For order cancellation, the system retrieves the Data Holder Node pointer by using the order's unique identifier as a key in the hash map, then proceeds to cancel the order. At the Data Holder Node level, this cancellation process mirrors order execution: the specified order is removed, and if it was the highest or lowest priority at that price level, the corresponding Price Level Pointer is also deleted or adjusted. The remaining orders in the node are then rearranged to reflect their updated priorities. Finally, once the order is successfully canceled, a signal is emitted through the post-processing message queue 103.

Order modification is implemented using a two-tiered approach. First, the system locates the Data Holder Node containing the order by looking up the order's unique identifier in the hash map. If only the order quantity has changed, the system simply finds the order's location within the node and updates the quantity accordingly. However, if the order's price has changed, the system cancels the existing order and treats the change as a new insertion at the revised price level. This approach is necessary because altering an order's price across the execution barrier—the best price on the opposite side—may trigger executions in the order book, or at least it changes the priority of the order if reinserted at different price level. As with order cancellation, a successful order modification results in the emission of a signal via the post-processing message queue 103.

As part of data transport 101 and 103, one embodiment implements a high-performance, single-producer, single-consumer queue with a strong focus on cache warming to reduce latency and improve throughput. All key member variables—including the atomic indices for writing and reading, as well as the ring-buffer storing the queue elements—ear explicitly aligned to the hardware's cache line size. This alignment minimizes cache line contention and eliminates false sharing.

Within the queue's "emplace" method, the queue uses atomic operations to safely insert new elements into the buffer. The method computes the next write index based on a bitmask and uses a loop to ensure that the producer does not overwrite unread data by comparing against a locally cached read index. By updating these indices using memory order-relaxed and memory order-release semantics, the implementation ensures efficient synchronization between the producer and consumer without incurring unnecessary overhead.

Figure 5:
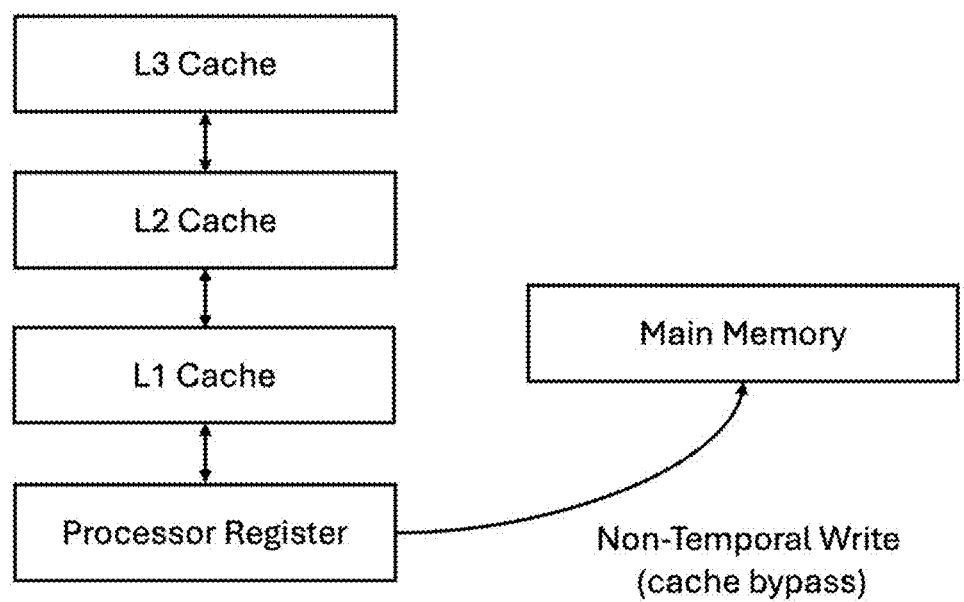
FIG. 5 is an abstract representation of the memory hierarchy in a general computer system.

As shown in FIG. 5, the implementation can optionally use non-temporal write operations during the "emplace" procedure to reduce cache pollution on the processor running core match unit 102. Because the post-processing messages are already known to the core match unit (the writer), retaining these messages in the writer's cache is unnecessary after they have been written. While this non-temporal approach might introduce a slight latency increase for the thread reading those messages, it can further enhance the throughput of core match unit 102. However, the performance benefits must be experimentally determined for each specific hardware configuration, as they may vary significantly based on several factors including:

1. NUMA (Non-Uniform Memory Access) relationships between the processor running the core match unit 102 and the processors managing message queues (101, 103)
2. Cache hierarchy and sharing patterns of the target architecture
3. Memory controller bandwidth and latency characteristics
4. Workload-specific access patterns and message sizes The "pop" method of the queue further exemplifies the cache-warming strategy by having a local flag that checks whether the next data is immediately available to read in its L1 cache. Only if the next element is not immediately available and there are multiple messages left to read, the prefetcher proceeds to fetch the next information and set the "available to read" flags. The actual transfer of the data is accomplished via a SIMD-optimized copying function (referred herein as SIMD_COPY), which further accelerates the data movement by leveraging vectorized instructions that move entire object in a single operation.

The invention claimed is:

1. A high-speed matching engine for processing electronic trade orders with ultra-low latency, implemented as computer-executable instructions stored in non-transitory memory and executed by one or more processors, the matching engine comprising:

(a) a memory-management system configured to allocate a plurality of core-specific Data Holder Nodes and at least one Price Level Descriptor;
(b) wherein each Data Holder Node:
  (i) is assigned a contiguous memory region having a size optimizing cache locality;
  (ii) stores a fixed, predetermined maximum number of order objects contiguously in that memory region, each order object including at least a price value and a quantity value, the contiguous storage permitting access to successive order objects without pointer dereference; and
  (iii) contains zero or more Price Level Pointers, each pointer occupying a designated slot within the node and present only when an order in that node is either the highest-priority or lowest-priority order at a corresponding price level;
(c) at least one Price Level Descriptor tree keyed by a price level value, each descriptor storing metadata for the price level and referencing the Data Holder Node that contains the highest-priority or lowest-priority order for that price level;
(d) at least one core-match unit, each operating in a single-threaded execution context for a financial instrument and configured to:
  (i) receive and process incoming orders from an inbound queue;
  (ii) match each incoming order against opposite-side resting orders stored in the Data Holder Nodes in accordance with a price-and-time or other predetermined priority rule;
  (iii) execute trades when matching orders are found; and
  (iv) update the Data Holder Nodes, Price Level Pointers, and the at least one Price Level Descriptor tree reflecting each execution, cancellation, or modification; and
  (v) relocating at least one existing order between the Data Holder Nodes, while maintaining the predetermined priority rule, when an insertion operation, including an Append or Prepend operation, would exceed the capacity of a Data Holder Node, by invoking a Push Back mechanism that relocates the order to a succeeding Data Holder Node or a Push Forward mechanism that relocates the order to a preceding Data Holder Node;
(e) conveying incoming orders to, and order acknowledgments and trade confirmations from, the at least one core-match unit via at least one data-transport mechanism, each comprising a lock-free, cache-aligned queue; and reducing latency by having slots aligned to a processor cache-line width in each queue.

2. The matching engine of claim 1, wherein for each processor core the memory-management system comprises:
(a) a first memory pool dedicated to allocating the Data Holder Nodes; and
(b) a second memory pool dedicated to allocating the Price Level Descriptors.

3. The matching engine of claim 1, wherein each Data Holder Node stores only references to Price Level Descriptors, such that no Price Level Descriptor object is physically embedded within the node.

4. The matching engine of claim 1, wherein:
(a) orders are stored contiguously in each Data Holder Node and are moved in bulk by vector-instruction copy operations; and
(b) two Price Level Pointers associated with the same price level may reference a single order object when that order is the sole order at that price level.

5. The matching engine of claim 1, wherein the Push Back mechanism is configured to relocate, together with its corresponding Price Level Pointer if present, the lowest-priority order within one of the Data Holder Nodes to an immediately succeeding Data Holder Node when insertion of the incoming order exceeds that Data Holder Node's capacity.

6. The matching engine of claim 5, wherein the Push Back mechanism is triggered by:
(a) comparing the priority of the incoming order with the priority of orders presently stored in one of the Data Holder Nodes; and
(b) selectively reassigning one or more orders to an immediately succeeding Data Holder Node until sufficient capacity is available in that Data Holder Node, while updating the at least one Price Level Descriptor tree to reflect the reassignment.

7. The matching engine of claim 1, wherein the Push Forward mechanism is configured to relocate, along with its associated Price Level Pointer if present, the highest-priority order within one of the Data Holder Nodes to an immediately preceding Data Holder Node when the Prepend operation exceeds that Data Holder Node's capacity, wherein the Push Forward mechanism cascades toward the head of the matching engine's order book as necessary.

8. The matching engine of claim 1, wherein each core-match unit maintains an in-memory hash-map data structure that stores a mapping from each order's unique identifier to an address of the Data Holder Node currently holding that order, thereby enabling O(1) retrieval for order cancellation or modification.

9. The matching engine of claim 1, wherein the memory-management system allocates memory in large contiguous blocks selected from 2 MB, 1 GB, or any hardware-supported huge-page sizes, thereby reducing translation lookaside buffer misses.

10. The matching engine of claim 1, wherein each Data Holder Node includes metadata storing (a) a current count of orders in the node and (b) references to adjacent Data Holder Nodes in a doubly or singly linked structure.

11. The matching engine of claim 1, wherein each Price Level Descriptor tree is a balanced search tree keyed by a price level value, thereby providing O(log n) insertion and search operations.

12. The matching engine of claim 1, wherein each lock-free, cache-aligned queue of the at least one data-transport mechanism is selected from the group consisting of single-producer/single-consumer, single-producer/multi-consumer, multi-producer/single-consumer, and multi-producer/multi-consumer configurations.

13. The matching engine of claim 1, further comprising a cache-warming module configured to prefetch Data Holder Nodes and Price Level Descriptors into at least an L1 cache and to align memory accesses with hardware cache-line boundaries to minimize cache misses.

14. The matching engine of claim 1, wherein the combination of contiguous memory storage in the Data Holder Nodes, fixed-capacity nodes, and lock-free data structures maintains consistent low-latency operation under peak-load conditions.

15. The matching engine of claim 1, wherein the at least one core-match unit is further configured to execute vector-instruction copy operations comprising single-instruction multiple-data (SIMD) instructions that transfer a block of contiguous order objects from one of the Data Holder Nodes to another of the Data Holder Nodes during the Push Back mechanism or the Push Forward mechanism, thereby reducing memory-move latency.

16. A computer-implemented method for executing electronic trade orders with ultra-low latency in a high-speed matching engine, the method comprising:
  (a) allocating, by a memory-management system executed by one or more processors:
    (i) a plurality of Data Holder Nodes, each assigned a contiguous memory region configured to optimize cache locality and store a fixed, predetermined maximum number of order objects, each including at least a price value and a quantity value, and
    (ii) for each price level, at least one Price Level Descriptor and constructing at least one Price Level Descriptor tree keyed by the price level value, each descriptor storing metadata for the price level and referencing one of the Data Holder Nodes that currently contains the highest-priority or lowest-priority order for that price level;
  (b) maintaining, for each Data Holder Node, zero or more Price Level Pointers occupying designated slots within the node and present only when an order stored in that node is the highest-priority or lowest-priority order at a corresponding price level;
  (c) receiving, in at least one single-threaded core-match unit, each unit dedicated to a respective financial instrument, an incoming electronic trade order from a lock-free, cache-aligned inbound queue;
  (d) matching the incoming order against opposite-side resting orders stored in the Data Holder Nodes in accordance with a price-and-time or other predetermined priority rule and executing trades until no further matching is possible;
  (e) inserting any unfilled quantity of the incoming order into one of the Data Holder Nodes by performing an Append operation or a Prepend operation, and, when the insertion would exceed that node's capacity, relocating at least one existing order between the Data Holder Nodes, while preserving the predetermined priority rule, by invoking a Push Back mechanism that relocates the order to a succeeding Data Holder Node or a Push Forward mechanism that relocates the order to a preceding Data Holder Node;
  (f) after each execution, cancellation, modification, insertion, or relocation, updating (i) the Data Holder Nodes, (ii) the Price Level Pointers, and (iii) the at least one Price Level Descriptor tree, such that each Price Level Descriptor continues to reference the Data Holder Node that contains the current highest-priority or lowest-priority order at its corresponding price level; and
  (g) conveying incoming orders to, and order acknowledgments and trade confirmations from, the at least one core-match unit via at least one data-transport mechanism each comprising a lock-free, cache-aligned queue; and reducing latency by aligning slots in each queue to a processor cache-line width.

17. The method of claim 16, wherein step (e) includes registering a new Price Level Descriptor in the at least one tree when the order's price level was not previously present.

18. The method of claim 16, wherein the memory-management system comprises one or more memory pools, each memory pool comprising a plurality of large pages, each subdivided into blocks that contain the pre-constructed Data Holder Nodes and a locally managed free-slot array that enables immediate reuse of released node slots.

19. The method of claim 16, wherein step (d) employs a vector-instruction copy routine to shift contiguous blocks of order data within or between the Data Holder Nodes, thereby maintaining an ordered structure of resting orders.

20. The method of claim 16, wherein inserting the unfilled remainder further comprises, when the remainder's price level is neither the top-of-book price level nor already represented in the matching engine's order-book data structure:
  (a) determining whether that price level exists by (i) performing an $O(\log n)$ search in the at least one Price Level Descriptor tree or, in an embodiment that maintains an auxiliary hash-map keyed by price level, (ii) performing an $O(1)$ lookup in the hash map; and
  (b) when the price level is absent, creating a new Price Level Descriptor and registering the descriptor in the at least one Price Level Descriptor tree and, when present, in the auxiliary hash map.

21. The method of claim 16, wherein step (e) includes invoking the Push Back mechanism to relocate, together with its corresponding Price Level Pointer if present, the lowest-priority order within one of the Data Holder Nodes to an immediately succeeding Data Holder Node when insertion of the incoming order exceeds that Data Holder Node's capacity.

22. The method of claim 16, wherein step (e) includes invoking the Push Forward mechanism to relocate, together with its corresponding Price Level Pointer if present, the highest-priority order within one of the Data Holder Nodes to an immediately preceding Data Holder Node when the Prepend operation exceeds that Data Holder Node's capacity, the Push Forward mechanism cascading toward the head of the matching engine's order book as necessary.

23. The method of claim 21, further comprising updating the at least one Price Level Descriptor tree, such that the Price Level Descriptor corresponding to the relocated order references the Data Holder Node that now contains that order.

24. The method of claim 22, further comprising updating the at least one Price Level Descriptor tree, such that the Price Level Descriptor corresponding to the relocated order references the Data Holder Node that now contains that order.

25. A non-transitory computer-readable storage medium storing computer-executable instructions that, when executed by one or more processors, cause the one or more processors to perform the method of claim 16.

* * * * *